United States Patent [19]

Hoyer-Ellefsen

[11] 4,340,830
[45] Jul. 20, 1982

[54] ELECTRIC MOTOR ASSEMBLY

[75] Inventor: Sigurd Hoyer-Ellefsen, New Canaan, Conn.

[73] Assignee: SCM Corporation, New York, N.Y.

[21] Appl. No.: 99,181

[22] Filed: Nov. 30, 1979

[51] Int. Cl.³ .............................................. H02K 5/00
[52] U.S. Cl. ......................................... 310/89; 310/90
[58] Field of Search ........................ 310/89, 42, 43, 45, 310/90, 254, 258, 255, 259, 216; 29/596

[56] References Cited

U.S. PATENT DOCUMENTS

| 2,139,012 | 12/1938 | Gillen | 310/40 MM |
| 2,668,925 | 2/1954 | Bloser | 310/258 |
| 2,819,417 | 1/1958 | Glass | 310/42 |
| 3,256,590 | 6/1966 | Myers | 310/42 |
| 3,492,517 | 1/1970 | Kuraisi | 310/89 |
| 3,979,822 | 9/1976 | Halm | 310/89 |
| 4,048,530 | 9/1977 | Kaufman | 310/89 |
| 4,048,717 | 9/1977 | Piette | 310/42 |
| 4,128,935 | 12/1978 | Czech | 29/596 |

FOREIGN PATENT DOCUMENTS 2222666 11/1973 Fed. Rep. of Germany ........ 310/40 MM

OTHER PUBLICATIONS

"Miniature Ball Bearings"; Ishii Steel Ball Co., Ltd., Tokyo, Japan; 1978.

Preliminary Tech. Bulletin" 7-2-7H; Emerson & Cuming Inc., Canton, Mass.; 1977.

Primary Examiner—R. Skudy
Attorney, Agent, or Firm—William E. Mear, III; Ernest F. Weinberger

[57] ABSTRACT

Apparatus and a method are disclosed for assembling an electric motor in which a unitary housing includes a base section having integral upright end walls. Each end wall is provided with a circular opening which openings are in coaxial alignment. A curable epoxy compound coats the surfaces of the base section and/or end walls for bonding a stator assembly within the unitary housing. The stator assembly is provided with a central bore which is axially aligned with the circular openings by having an alignment pin extending therethrough while the epoxy is in a pliable state. The epoxy is then cured with the alignment pin in position. After curing the pin is removed. The stator is now rigidly attached to the housing with its bore and the openings precisely aligned along the common axis of the motor. A rotor subassembly is inserted lengthwise through the openings and the stator bore with its bearings located in a corresponding opening on the housing for rotatable free support of the rotor in the bore. The rotor is axially retained by a set of retainers fixedly mounted within the openings.

3 Claims, 3 Drawing Figures

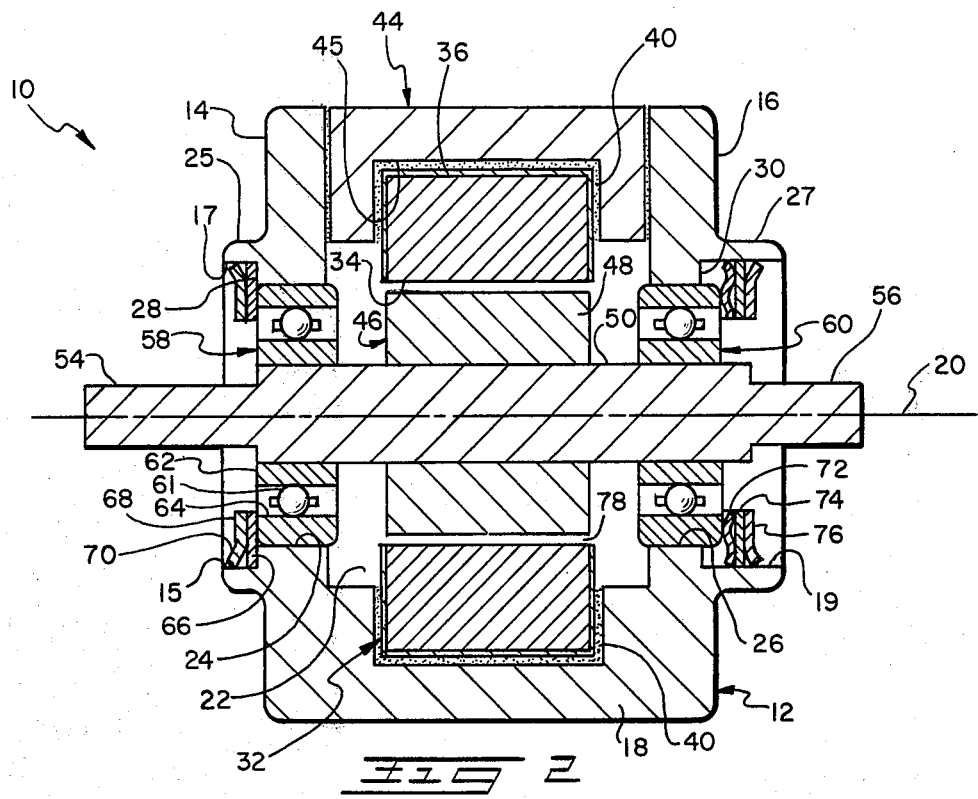
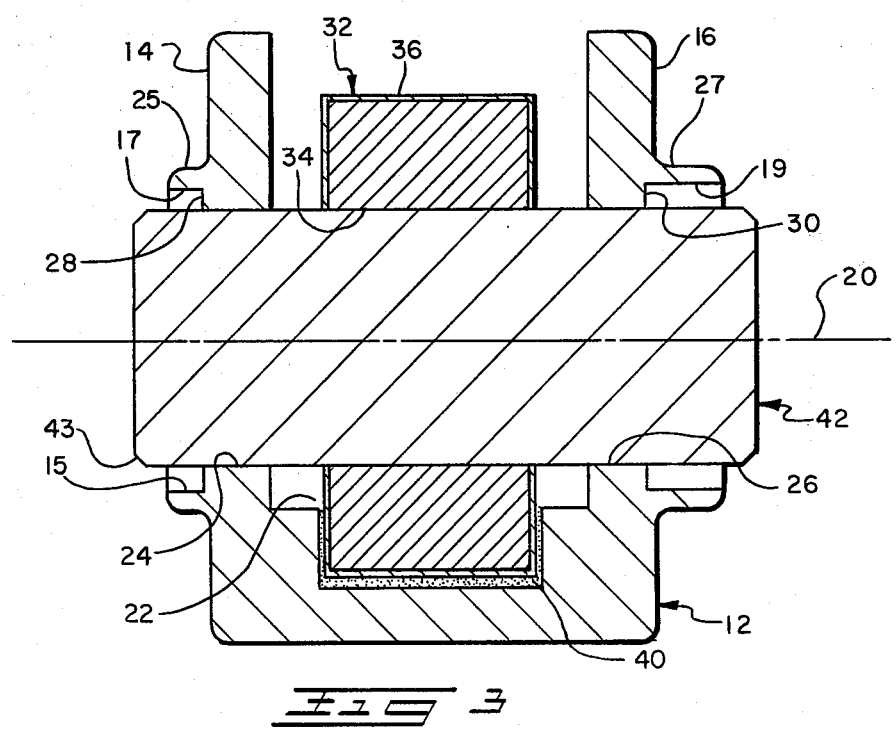

ELECTRIC MOTOR ASSEMBLY

BACKGROUND OF THE INVENTION

The present invention relates to an apparatus and a method for assembling an electric motor.

In the field of dynamoelectric machinery, and particularly electric motors, there is generally found in each the same basic components having a similar assembled working relationship among these components. Typically, electric motors include a stationary stator for operation of a rotor rotatably mounted on support structure, such that, a substantially true coaxially spaced relationship exist about the rotor within a core of the stator. To this end, the prior art discloses different kinds of motor structures assembled by methods especially developed to suit the structural requirements and needs of the particular motor.

A common structural approach in the prior art for accomplishing a true concentricity relationship between the rotor and the stator is to provide a motor support housing comprising separate sections with each section having openings, such as a bearing seat, for supporting ends of a rotor shaft. During assembly of the motor, the two openings must be precisely coaxially aligned for efficient motor performance and this is usually accomplished by a specially designed fixture. Once so aligned, a mechanical device, such as screws are used to permanently attach the orientated housing sections together. Motors built with individual housing sections having a rotor mount opening in each section are undesirable since they are complex and include a high part inventory. The sectional motor housing structures further demand excessive assembly time which often requires skilled adjustments. Consequently, such motors are difficult to economically produce in high volume.

In motor assembly techniques, epoxy resin is used as a bonding agent for attaching stationary motor components, especially within the stator. Epoxy resins and the like allows accurate assemblage of parts irrespective of dimensional variations as well as providing thermal, if desired, and electrical insulation. However, use of epoxy resin requires employment of elaborate assembly fixtures to accurately maintain and hold motor components during curing operation of the epoxy. These fixtures vary in structure for each different motor construction and usually include placement of shims to accurately gap the rotor and the stator during curing of the resin.

Examples of prior art assembly techniques are illustrated in U.S. Pat. Nos. 2,668,925, 3,256,590, 4,048,717 and 4,128,935.

SUMMARY OF THE INVENTION

The general purpose of the present invention is to provide apparatus and a method for assembly and construction of an electric motor. The final assembly arrangement of parts is similar to prior art motors with respect to providing an accurate fixed air gap between the rotor and the stator. The present invention, however, avoids disadvantages found in the prior art, namely elaborate and complex assembly fixtures used to establish the air gap between the rotor and stator. This gap must be closely controlled since it is a primary factor in the overall operating efficiency of the motor.

Accordingly, the present motor includes a unitary or one-piece housing characterized by a base section extending along the longitudinal axis of the motor and by a pair of integral upright end walls each provided with a bearing seat opening, which openings are in prearranged coaxial alignment. A stator having a central bore is firmly attached within the housing by a layer of solidified epoxy compound. A rotor subassembly is supported within each opening of the housing for rotation of the rotor within the bore of the stator. As a result, an efficient accurate and true air gap exists between the rotor and the stator because of the pre-established size relationship of the slightly smaller outer rotor diameter to the inner diameter of the stator bore.

In the procedure for assembling the present motor, internal surfaces of the base section and, if desired, portions of the end walls are coated with the curable adhesive epoxy resin while in an uncured liquid state. It should be pointed out, the housing is of a dimensional size and form so as to almost support the stator by physical contact such that the bore in the stator is aligned with the openings in the housing. The stator is then placed in the housing and orientated such that the axis of the bore extends substantially along the axis defined by the centers of the end wall openings. The bore through the stator and the opening through each end wall are equal in diameter. Thus, an alignment pin, sized to have a slip-fit relationship to the bore and the openings, is inserted through both openings and the bore thereby establishing a coaxial relationship therebetween while supporting the stator in engagement with the liquid epoxy. In this position the epoxy is cured to a solid state, fixing the stator to the housing. The pin is then removed, enabling subsequent handling of the stator/housing combination without changing the set relative position therebetween. A restraint means comprising a flat washer and a lock washer are press-fitted into one of the housing openings. A rotor subassembly including axially fixed bearing members carried on a rotor shaft is then inserted through the free housing opening and the bore so that the rotor bearings are supported in the housing openings with the restraint means limiting axial movement along the insertion path. The lateral relationship of the rotor subassembly in the housing is thus controlled, such that while the rotor is centrally located within the stator bore, the other bearing member sits within the free opening. Another set of restraining members comprising a resilient wave washer, a flat washer, and a lock washer are then press-fitted into the other housing opening thereby totally limiting axial movement of the rotor subassembly. The amount of pressure exerted when mounting the second mentioned set of restraining members must be limited to a value which avoids binding of bearings, hence the use of a resilient washer. The bearing members have a tight-fit relationship with the end wall openings so as to support the rotor concentrically about the motor axis along the entire length of the rotor. The rotor is presized such that its outside diameter is slightly smaller than the inside diameter of the stator bore. Accordingly, a uniform precision air gap is provided circumferentially about the rotor in the stator bore.

By the disclosed assembly procedure of the present motor, it can be appreciated that the air gap is readily controlled with a precise amount and limited primarily by machining tolerances in manufacture of the rotor and the stator bore. From the above and the detailed description below, applicant's motor structure and assembly techniques are free of complex assembly fixtures, particularly avoiding the use of shims often required in assembly of prior art motors for aligning the rotor in the stator so as to establish the desired air gap therebetween.

Accordingly, it is an object of the present invention to provide a unique motor structure and components which may be accurately and readily assembled.

It is another object of the present invention to provide a method for readily assembling motor components in such a manner as to provide an accurate coaxial alingment relationship among parts necessary to facilitate subsequent efficient motor operation.

It is still another object of the present invention to provide apparatus and a method for making an electric motor that is of simple construction, has few components and is extremely easy to assemble with a minimum number of steps, without necessitating complex holding fixtures during assembly.

Other objects, features and advantages will become more apparent from the following description, including appended claims and accompanying drawing.

BRIEF DESCRIPTION OF THE DRAWING

FIG. 2 is a vertical sectional view normal to the axis of a motor assembled in accordance to the teachings of the present invention; and FIG. 3 is a vertical sectional view of the motor during the assembly process according to the method of the present invention.

DETAILED DESCRIPTION OF THE PREFERRED EMBODIMENT

Figure 1:
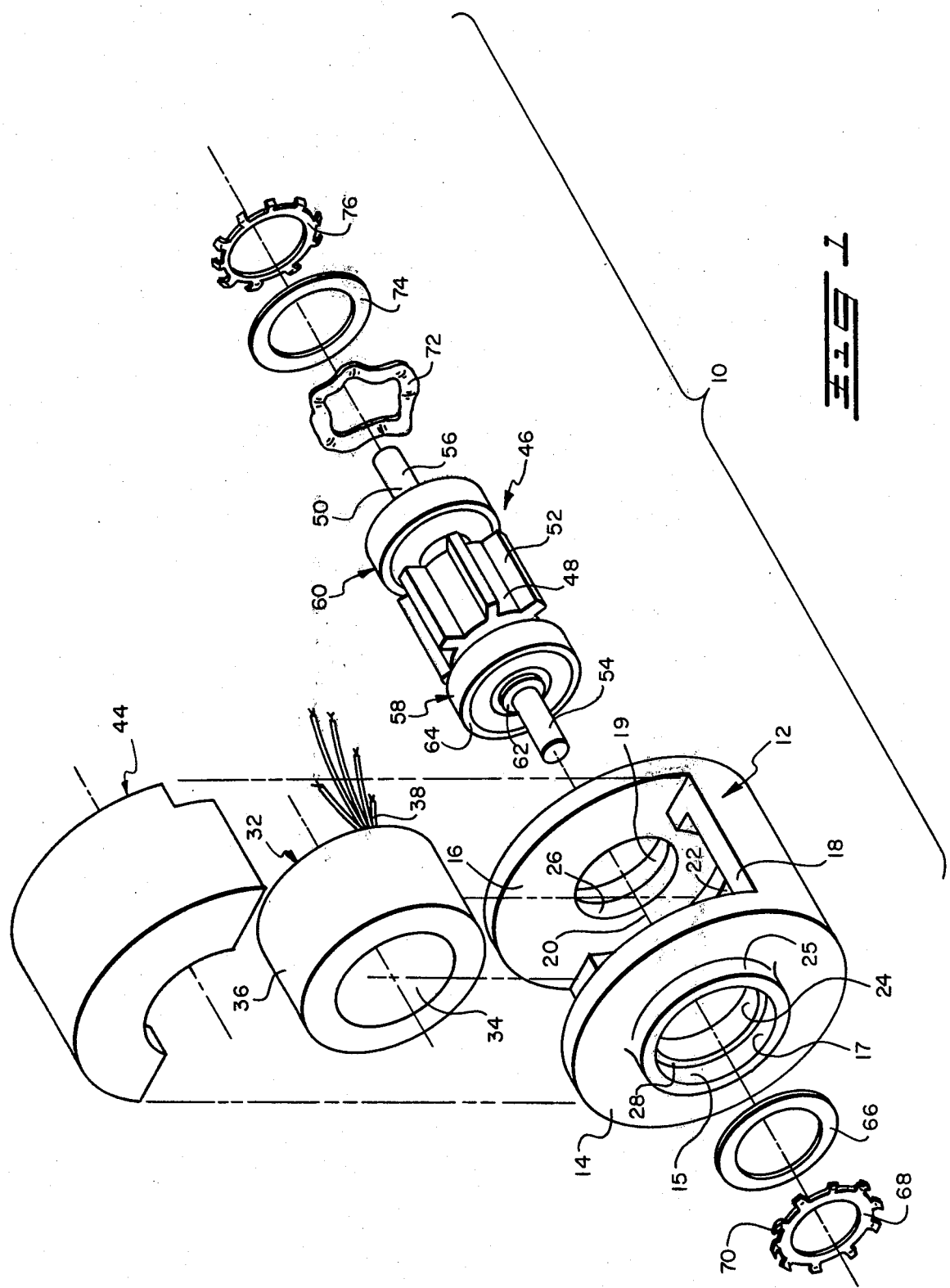
FIG. 1 is an exploded view in perspective showing the components used in the motor assembly.

In the illustrated embodiment of FIGS. 1 and 2, a motor 10 includes a one-piece or unitary housing 12 which provides structural framework for support of other components used in assembling the motor 10. The housing unit 12 includes first and second upright end walls 14 and 16, respectively, which are longitudinally spaced from each other through an integrally connected elongated trough-like base section 18. As best shown in FIG. 1, the base 18 is substantially U-shaped in cross-section and has a central longitudinal axis 20 about which the arcuate portion of the U-shaped base 18 is developed. As will become apparent from the description below, the axis 20 is common to other parts of the assembled motor 10 and forms the operational axis of motor 10. Internal surfaces of walls 14, 16 and base 18 define a basin cavity area 22 in the housing unit 12 for receipt of the other motor components.

The housing unit 12 preferably is cast formed from a moldable thermally conductive material that will act as a heat sink and radiate excess heat that is generated in prolonged operation of the motor 10. Thus, potential damage to the motor 10 caused by excessive heat build-up is minimized, thus ensuring long term efficiency of the motor 10. In the preferred embodiment, the housing unit 12 is formed of an aluminum alloy although other suitable well known materials are available.

In FIG. 1, the housing unit 12 is shown in detail and includes a first circular opening or bearing seat 24 machined through the first end wall 14. The circular opening 24 is positioned approximately at the center of wall 14 and its axis corresponds to the axis 20 of housing unit 12. Another circular opening or bearing seat 26 has likewise been machined through the second end wall 16 and has the same diameter measurement as the opening 24. The openings 24 and 26 are arranged in precise coaxial alignment on the axis 20. In addition, end walls 14, 16 are provided with integral hollow cylindrical extensions 25, 27 respectively, wherein each is provided with a counterbore 15, 19 slightly larger in diameter than the openings 24, 26 thereby forming a shoulder or step 28, 30 therein.

A preassembled stator component 32 suitable for use in motor 10 is typically provided with a central longitudinal bore 34 extending therethrough. Preferably, the bore 34 is sized identical to openings 24 and 26. The stator 32 includes a cylinder 36 fixed on the stator 32 to function as a protective wrap or casing. Disposed within cylinder 36 are the usual stator windings of wire on a stack of laminations (not illustrated) comprising stator 32. From the internal windings, a set of wire leads 38 extend external to the casing 36 for operable electrical connection with a remote power source. Stator 32 is dimensioned to be loosely disposed within the basin cavity area 22 of housing unit 12 and thereby permits some manipulation of the stator 32 in basin 22 to align the axis of the bore 34 with the axis 20 of housing 12.

Assembly of stator 32 to housing unit 12 is accomplished in the following manner. First a layer of curable adhesive epoxy resin, indicated as 40 in FIGS. 2 and 3, is applied to substantially cover the interior surfaces of the basin 22. The epoxy 40 is applied in a pliable liquid state so as to be easily spread. Any suitable method may be used to apply the epoxy 40 onto the interior surfaces of the base section 18 and, if desired end walls 14, 16. Alternatively, epoxy resin 40 may be applied onto the stator casing 36 or both mating areas including casing 36 and interior surfaces comprising basin 22. The thickness of the epoxy 40 coating is such that it will support the stator 32 and permit alignment of the bore 34 with the openings 24, 26 along the axis 20. The requirements considered in selection of a suitable epoxy mixture include: good adhesion quality for permanently bonding the stator 32 to housing 12, moderate to high viscosity through a spreadable pot texture, and—most important—a very high thermal conductivity for enhancing heat transmission therethrough to avoid excessive motor 10 temperatures. For these reasons, the epoxy resin compound selected for use in the preferred embodiment is STYCAST 2850 MT, a registered name for a material supplied by Emerson and Cuming, Inc., Canton, Mass. Preliminary technical bulletin identified by 7-2-7H and appearing in a booklet entitled "Plastics/Ceramics For Electronics" dated February 1977 fully discloses the properties of STYCAST 2850 MT. The curing agent selected for STYCAST 2850 MT is preferably Catalyst 9 whose mixture formula is also disclosed in the aforementioned bulletin 7-2-7H.

Next, stator 32 is positioned within the basin area 22 and in contact with the epoxy 40. Pressure may be exerted on stator 32 to insure uniform disposition of the epoxy 40 throughout the basin 22 and to approximately align the axis of bore 34 with axis 20 of the housing 12.

Referring now to FIG. 3, an alignment pin 42 is shown as being positioned through stator 32 and the housing 12 as part of the procedural steps for assembling motor 10. Pin 42 has a slip-fit relationship with respect to the openings 24, 26 and stator bore 34. With the stator 32 supported on the pliable epoxy 40, pin 42 is first inserted through one of the openings, 26 for example. Next, a tapered end 43 of pin 42 is forcibly inserted through bore 34 and positioned slightly beyond the opposite end wall opening 24. Pin 42 is now supported in openings 24, 26 and in turn supporting the stator 32 in coaxial alignment while in engagement with the epoxy 40.

With the stator 32 so positioned, epoxy 40 substantially fills the space between the internal surfaces of the basin 22 and adjacent exterior surfaces of the casing 36. Should excess epoxy 40 be extruded from open edges around the basin 22 upon insertion of the pin 42, such excess should be simply removed as by a wiping operation. The epoxy 40 is then cured to a solid state thereby rigidly bonding stator 32 to the housing unit 12. While curing may be accomplished in any one of several known suitable fashions, application of heat is preferred in order to expedite assembly time. Once the curing operation is complete, pin 42 is removed. Stator 32 is now integrally fixed to the housing 12 through the now solid epoxy 40 with bore 34 coaxially in line with the openings 24 and 26. Applicant has found that this procedure consistently provides accurate coaxial alignment between bore 34 and the openings 24 and 26 within a few hundred thousandths of an inch.

In the preferred embodiment of FIGS. 1 and 2, a coverplate 44 is provided to protect any exposed portion of stator 32 from damage. Like housing 12, coverplate 44 is constructed of a rigid, thermally conductive material to enhance overall transmission of heat from stator 32 during operation of motor 10. The coverplate 44 is cross-sectionally U-shaped similar to base 18 and is elongated to be closely received between the upright walls 14 and 16.

To attach coverplate 44 onto stator 32, a layer of curable adhesive epoxy, preferably epoxy 40, is applied in a pliable state onto an interior surface 45 of the U-shaped coverplate 44. The coverplate 44 is then pressed onto exposed portions of the stator 32 protruding from basin 22 within the housing 12, the pressing being in a direction perpendicular to axis 20. This attachment is preferably done while the stator 32 is still supported on pin 42 and also prior to the curing operation. Thus, the preferred procedure enables all of the epoxy 40 to be cured during a single curing operation.

A rotor subassembly component 46 for the motor 10 includes a rotor 48 coaxially carried on a shaft 50. The rotor 48 may be of conventional design and is illustrated as having radially extending blades 52 suitable for operating with the particular stator 32. The shaft 50 is elongated, having extensions 54 and 56 projecting beyond ends of the rotor 48. A first bearing member 58 is axially fixed on the first shaft extension 54 via press-fit of a hub 62 and is located a predetermined spaced distance from one end of the rotor 48. A second bearing member 60, similar to the first bearing 58, is axially fixed on the other extension 56 and is likewise located at a predetermined distance from the other end of the rotor 48. As is common, ball bearings 61 are confined intermediate an outer ring member 64 and inner hub 62 (ie, race) to permit free rotation therebetween (ie, rotor 48 and supporting housing 12). A supplier of a suitable precision bearing is Miniature Ball Bearings of Ishu Steel Ball Co., Ltd. having a place of business in Tokyo, Japan. Their 1978-A, booklet entitled "Precision Miniature and Instrument Bearings" fully outlines satisfactory bearing specifications.

Subsequent to the affixing of the stator 32 to the housing 12, the rotor subassembly 46 is to be assembled to the housing 12. First, however, a flat washer 66 is freely positioned within counterbore 15 of opening 24 for face to face abutment with the step 28. A retaining fingered lock washer 68 is then pressed into the counterbore 15 for firm axial positioning of the flat washer 66 in the above-mentioned abutting relationship with the step 28. Lock washer 68 has a plurality of radially extending fingers 70 that slidably engage the peripheral surface 17 of the counterbore 15 while being pressed into position since the fingers 70 are formed to angle away from the direction of assembly. Once this set of retainers 66, 68 is in position (FIG. 2), axial movement thereof toward the left is prevented due to the fingers 70 having a bite grip with the peripheral surface 17 of the counterbore 15. Each washer 66 and 68 has a circular central opening about axis 20 for freely receiving the shaft extension 54. The rotor subassembly 46 is then slid into position by passing the bearing member 58 through the still free second opening 26 of housing 12 and through stator bore 34, into the first opening 24 for side abutment of bearing 58 with the blocked flat washer 66. This axially limits motion of the rotor subassembly 46 toward the left and locates the other bearing 60 within opening 26 for rotatable support of the rotor subassembly 46 about axis 20. To prevent the rotor subassembly 46 from axially moving toward the right, another set of retaining members is assembled in a counterbore 19 of opening 26. This set of retaining members includes a resilient wave washer 72 for side abutment with the bearing member 60, a flat washer 74 and a retaining lock washer 76. The latter two washers 74 and 76 are identical to washer members 66 and 68 respectively. The resilient washer 72 is positioned to bear against the outermost end of the bearing 60, and the flat washer 74 is held against washer 72 by the retaining lock washer 76. The depth to which lock washer 76 is inserted within opening 26 is controlled so that pressure exerted on the bearing members 58 and 60 by the resilient washer 72 permits free rotation of the asembled rotor 48 and shaft 50. Employment of resilient washer 72 maintains a constant pressure and allows for changes in axial pressure due to wear and temperature.

Referring to FIG. 2, the rotor 48 of assembled motor 10 is concentrically located within the stator bore 34 since the ring portion 64 of each bearing 58 and 60 has a tight slip-fit relationship within the respective opening 24 and 26, thus avoiding angular misalignment with respect to axis 20. A concentric gap of air, shown at 78, is provided between rotor 48 and stator bore 34. The air gap 78 is the medium that controls the rotational performance of the rotor 48 in terms of torque output from the energized stator 32. The thickness of air gap 78 is substantially established prior to assembly and in an amount calculated to provide efficient operation of the particular motor 10. This gap 78 between the rotor 48 and the bore 34 is readily established by machining the bore 34 and grinding the rotor 48 to this desired accurate diameter. This cylindrical gap 78 relationship between the rotor 48 and the bore 34 is maintained during the assembly of the motor 10, since cumulative tolerances affecting the air gap 78 have been minimized in the present assembly technique. Specifically, the precision of air gap 78 of the present invention is dependent primarily on the machining and grinding tolerances and their relationship with the tolerances of the precision bearings 58 and 60.

From the above description, it is apparent that the novel method of assembly and components of the motor 10 provide many advantages, including economical production, especially for high volume assembly rates. For example, the present motor 10 includes a minimum number of parts, namely, the housing unit 12 which accurately supports the stator 32 through solidified epoxy 40 and the rotor subassembly 46 having coupled bearing members 58 and 60 seated in the openings 24 and 26, respectively, in the housing unit 12. Since the bearing openings 24 and 26 have been fabricated for precise coaxial alignment on the axis 20 of the motor 10, all parts assembled therein will automatically be aligned about the established axis 20. Consequently, time-consuming mechanical adjustments previously required to accomplish accurate coaxial orientation of rotary motor components during assembly of prior art motors have been avoided by the teachings of this invention.

In summary, while it is well known to use epoxy as a medium for attaching motor components, this procedure normally requires use of complex unique fixtures or jigs such as shims to set and hold the components in their desired relationship during curing. The present invention desirably avoids use of such complicated and costly fixtures. The simplicity of the present motor 10 is enhanced by the fact that the construction is free of mechanical attaching members, such as screws, bolts, nuts, etc.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. An electric motor assembly comprising:
(A) a one-piece housing formed with a base section and a pair of spaced apart upstanding end walls, each one of said end walls being formed with an opening therethrough having a coaxial relation therebetween and one of said openings being formed with a step;
(B) a stator assembly including a central bore therethrough;
(C) means for mounting said stator assembly on said base section with said central bore being coaxially aligned with said openings;
(D) a rotor fixedly supported on a shaft, said rotor being disposed within said central bore and said shaft being rotatably supported in said openings;
(E) a first bearing axially fixed on one end of said shaft for permitting relative rotational movement therebetween, said first bearing being supported in said opening with said step;
(F) a second bearing axially fixed on the other end of said shaft for permitting relative rotational movement therebetween, said second bearing being supported in the other opening; and
(G) means for preventing axial movement of said rotor comprising:

(a) a first set of retaining members including a rigid flat washer and a fingered lock washer located in said opening with said step, said flat washer being positioned in abutment with said step and said first bearing and said lock washer having fingers that grip the peripheral surface of said stepped opening to firmly hold said flat washer in said position to prevent axial displacement of said rotor in one direction; and
(b) a second set of retaining members including a resilient ring, a second flat washer and a second fingered lock washer located in the other opening, said resilient ring being positioned in abutment with said second bearing through said second flat washer and said second lock washer having fingers that grip the peripheral surface of the other opening to firmly hold said second flat washer and said resilient ring in said position to prevent axial displacement of said rotor in a direction opposite said one direction.

2. An electric motor assembly comprising:
a one-piece housing which comprises an integral casting including a base section and a pair of spaced apart upstanding end walls, said base section being U-shaped in cross-section perpendicular to the axis of the motor and said end walls being cast-formed together with said base section, each one of said end walls having an opening formed therethrough having a coaxial relation therebetween;
a stator assembly including a central bore therethrough;
means for mounting said stator assembly on said base section for locating said central bore in coaxial alignment with said openings; and
a rotor supported on a shaft, said rotor being disposed within said central bore and said shaft being rotatably supported in said openings.

3. An improved electric motor housing structure for assembly thereon of motor components including a rotor fixed on a shaft, bearing means coupled on ends of the shaft for rotatable support of said rotor and a stator assembly having a central bore extending therethrough for receiving said rotor, the improved housing structure comprising:
a one-piece casting having a U-shaped base section formed with a pair of spaced apart end walls, a through hole being formed through each one of said end walls in coaxial relation, the stator assembly being received in said base section and fixedly held by a bonding agent for locating the central bore in coaxial alignment with said through holes and the bearing means engaging the peripheral surface of said through holes for supporting the rotor in a working relation within the central bore.

* * * * *